(No Model.)
J. C. BEETLE.
BUTTON HOOK.
No. 294,186. Patented Feb. 26, 1884.
Fig. 1
Fig. 2
Fig. 3
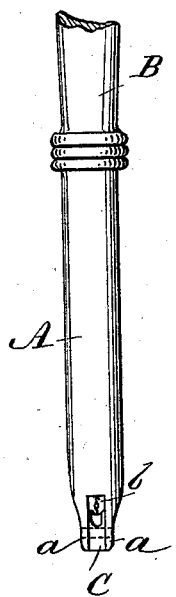
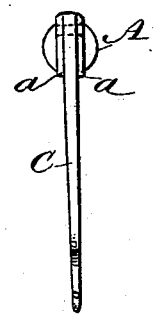
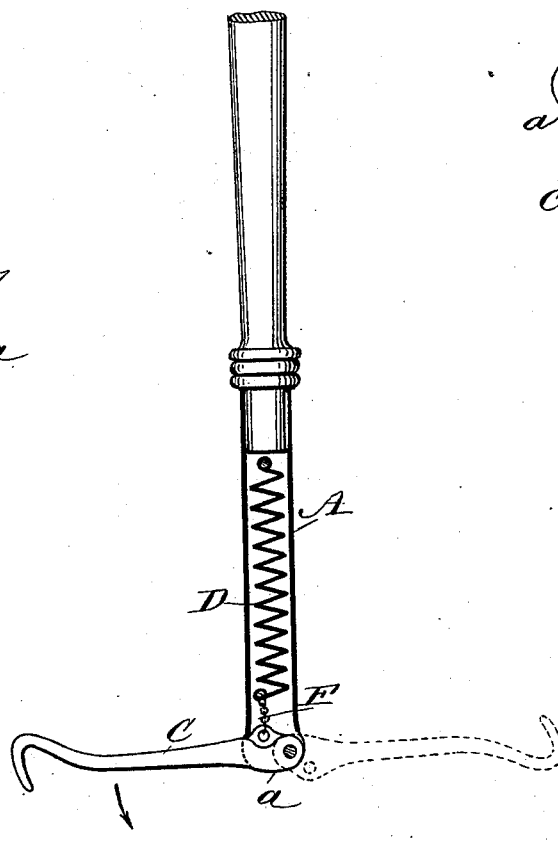
WITNESSES:
C. Neveux
C. Sedgwick
INVENTOR:
J. C. Beetle
BY
ATTORNEYS.

UNITED STATES PATENT OFFICE.

JAMES CLARENCE BEETLE, OF NEW BEDFORD, MASSACHUSETTS.

BUTTON-HOOK.

SPECIFICATION forming part of Letters Patent No. 294,186, dated February 26, 1884.

Application filed December 27, 1883. (No model.)

*To all whom it may concern:*

Be it known that I, JAMES C. BEETLE, of New Bedford, in the county of Bristol and State of Massachusetts, have invented a new and Improved Button-Hook, of which the following is a full, clear, and exact description.

The object of my invention is to provide a new and improved button-hook, by means of which shoes can be buttoned without requiring the person to stoop.

The invention consists in a button-hook pivoted on the end of a handle.

The invention further consists in the combination, with the said hook and handle, of a spring for holding the hook at right angles to the handle.

The invention also consists in various parts and details and combinations of the same, as will be fully set forth hereinafter.

Reference is to be had to the accompanying drawings, forming part of this specification, in which similar letters of reference indicate corresponding parts in all the figures.

Figure 1 is a longitudinal sectional elevation of my improved button-hook, parts being broken out. Fig. 2 is a longitudinal elevation of the same. Fig. 3 is an end elevation of the same.

A tube, A, is held in some suitable manner on the end of a long handle, B. At the outer end the sides of the said tube are pressed together to form jaws $a$, between which a hook, C, is pivoted at the ends of the same, the pivot being passed through the end of the hook. A spiral spring, D, contained in the tube A, has one end held at the inner end of the tube, and the outer end of the spring is held on the pivoted hook C a short distance from the pivot in the direction toward the free or swinging end of the hook. At the ends of the jaws $a$ notches $b$ are formed, against the ends of which the edges of the hook C can rest. A short chain, F, or other suitable flexible connection, connects the outer end of the spring D with the shank of the hook C, as shown.

The button-hook is used in the following manner: The hook is passed through the button-hole and around the button-shank, the hook being in the position shown in full lines in Fig. 1. The handle is then drawn upward until the hook is in line with the handle, and then the hook is turned and the handle is pressed down, to swing the hook into the position shown in dotted lines in Fig. 1. If the hook is then withdrawn from the shoe, the spring D swings the hook C back into the position shown in full lines in Fig. 1.

Having thus described my invention, I claim as new and desire to secure by Letters Patent—

1. The combination, with a handle, of a button-hook pivoted on the end of the same, and of a spring for holding the hook at right angles to the handle, substantially as herein shown and described.

2. The combination, with a handle, of a tube held on the end of the same, a button-hook pivoted in the outer end of the tube, and a spring held in the tube and acting on the hook in such a manner as to hold it at right angles to the tube, substantially as herein shown and described.

3. The combination, with the handle B, of the tube A, having jaws $a$, and notches $b$, formed on its outer end, the hook C, pivoted in the outer end of the tube A, the spring D, and the chain F, substantially as herein shown and described.

JAMES CLARENCE BEETLE.

Witnesses:
A. EDWIN CLARKE,
HENRY B. WORTH.